United States Patent [19]

Cisler

[11] Patent Number: 4,807,093
[45] Date of Patent: Feb. 21, 1989

[54] TWO-WAY VANITY MIRROR VISOR

[75] Inventor: Bruce W. Cisler, Holland, Mich.

[73] Assignee: Prince Corporation, Holland, Mich.

[21] Appl. No.: 121,033

[22] Filed: Nov. 16, 1987

[51] Int. Cl.$^4$ .............................................. F21V 33/00
[52] U.S. Cl. ..................................... 362/74; 362/144; 296/97.5
[58] Field of Search ...................... 362/61, 80, 74, 135, 362/142, 144, 143; 296/97 C, 97 H, 97 B, 97 F, 97 J, 97 G, 97 R; 350/604, 606; 132/80 A, 79 G, 83 R, 83 E

[56] References Cited

U.S. PATENT DOCUMENTS

| | | | |
|---|---|---|---|
| 3,375,364 | 3/1968 | Marcus | 362/80 |
| 4,213,169 | 7/1980 | Kempkers . | |
| 4,227,241 | 10/1980 | Marcus | 362/142 |
| 4,384,740 | 5/1983 | Marrotta . | |
| 4,394,065 | 7/1983 | Swanson | 350/606 |
| 4,486,819 | 12/1984 | Marcus et al. | 362/142 |
| 4,511,954 | 4/1985 | Marcus et al. | 362/74 |
| 4,541,663 | 9/1985 | Schwanitz et al. | 362/144 |
| 4,624,499 | 11/1986 | Flowerday | 362/144 |
| 4,652,982 | 3/1987 | Flowerday | 362/135 |
| 4,711,483 | 12/1987 | Gulette et al. | 296/97 C |

Primary Examiner—Ira S. Lazarus
Assistant Examiner—D. M. Cox
Attorney, Agent, or Firm—Price, Heneveld, Cooper, DeWitt & Litton

[57] ABSTRACT

A visor having a body with a central opening extending through the body. A cover selectively encloses the opening on one side of the visor. Pivotally mounted to the visor is a mirror and frame with the mirror facing the cover and movable between a position co-planar with and enclosing the opposite side of the opening for storage to a lowered use position in which the mirror is exposed for use when the visor is in a raised stored position. When the visor is in a lowered sun blocking position and the mirror frame is in its stored position, the cover can be opened for exposing the mirror from the rear facing surface of the visor.

14 Claims, 4 Drawing Sheets

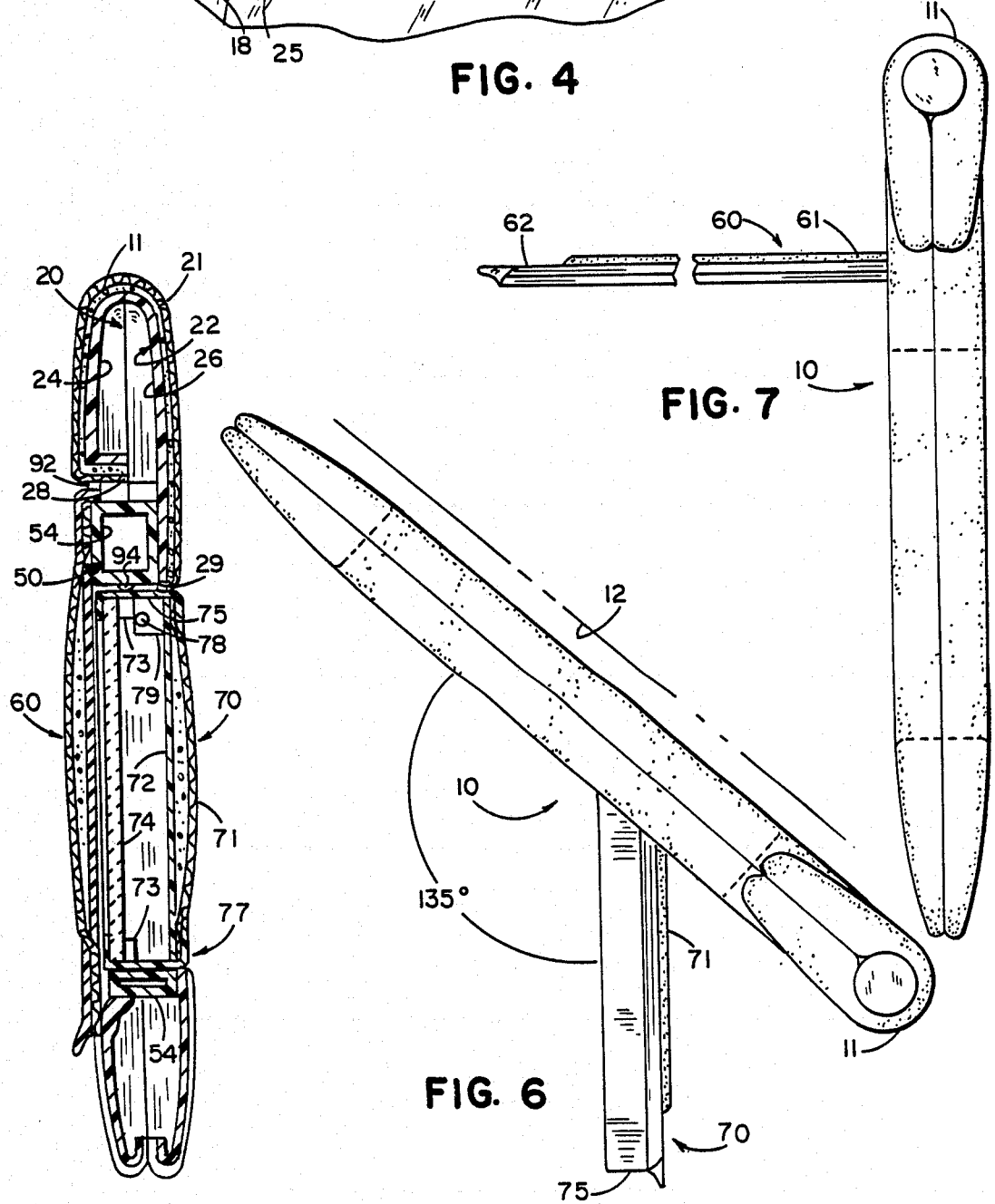

TWO-WAY VANITY MIRROR VISOR

BACKGROUND OF THE PRESENT INVENTION

The present invention pertains to vehicle visors and particularly to visors which include vanity mirrors.

Visors having illuminated and/or covered vanity mirrors have become an increasingly popular vehicle accessory and standard equipment on many vehicles which may include one or more visors of the type shown in U.S. Pat. No 4,227,241. To use the mirror in these visors and other vanity mirror visors, it is necessary to first lower the visor from a stored position adjacent the roof of the vehicle, and in the case of a covered vanity mirror, uncover the mirror for use. The inconvenience of this two-step process is in addition to the distraction to the driver of a passenger manipulating the passenger-side visor through multiple steps.

SUMMARY OF THE PRESENT INVENTION

The visor of the present invention overcomes the problems of the vanity mirror visors of the prior art by providing a visor having a body with a central opening extending through the entire body. Mounted to the body on one side is a cover which moves between opened and closed positions. Pivotally mounted to the opposite side of the visor body within the opening is a vanity mirror and in the preferred embodiment, an illuminated mirror. The mirror faces the cover and pivots between a position co-planar with and enclosing one side of the opening for storage to a lowered use position through an arc of at least 90° to expose the mirror for use when the visor is in a raised stored position. When the visor is in a lowered sun blocking position with the mirror stored, the cover can be opened for exposing the mirror from the rear facing surface of the visor.

In the preferred embodiment of the present invention, illumination means are provided for illuminating the vanity mirror and switch means are provided and are actuated upon opening of the cover and/or pivoting of the mirror from a stored position to a use position for illuminating the lamps included in the illumination means. In the preferred embodiment, also a side opposite the mirror defines a second cover which is finished to conform to the visor appearance.

Such structure therefore provides a compact visor having a mirror assembly therein which can be easily used when the visor is in either a stored position against the vehicle headliner or in a lowered used position. The unique multiple cover construction with an illuminated vanity mirror mounted inside one of the covers provides flexibility for use of the illumination means also for map reading or other related functions.

These and other features, objects and advantageous of the present invention will become apparent upon reading the following description thereof together with reference to the accompanying drawings in which:

BRIEF DESCRIPTION OF THE DRAWINGS

FIG. 4 is a fragmentary perspective view of the visor in the same position shown in FIG. 3 with the illuminated vanity mirror exposed for use;

FIG. 5 is a enlarged vertical cross-sectional view taken along section lines V—V of FIG. 3;

FIG. 6 is a right side view of the visor shown in FIG. 2;

FIG. 7 is a right side view of the visor shown in FIG. 4;

DETAILED DESCRIPTION OF THE PREFERRED EMBODIMENT

Figure 1:
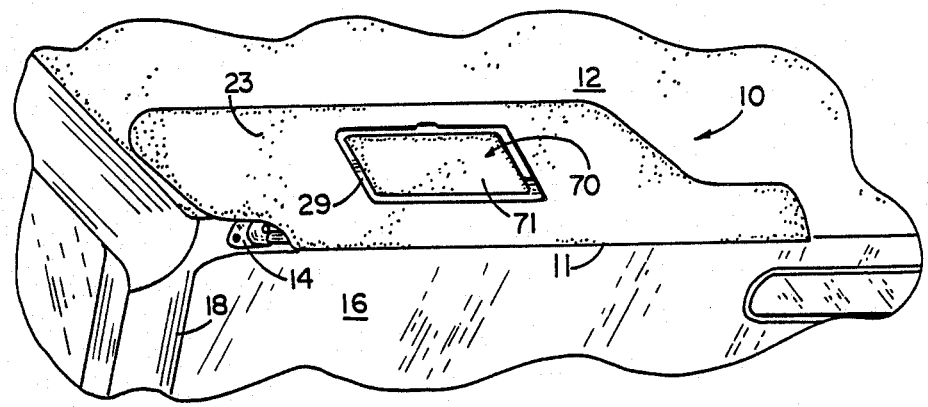
FIG. 1 is a fragmentary perspective view of a driver side visor embodying the present invention and shown in a raised stored position.

The visor 10 of the present invention as illustrated in the figures, is a driver side visor mounted to the roof 12 of a vehicle by means of a pivot mounting bracket 14 above the vehicle windshield 16 and adjacent the driver side A-pillar 18. A hollow visor pivot rod 15 (FIG. 4) extends from the mounting bracket 14 into the body of the visor near the top edge 11 thereof for supporting the visor for rotation to a lowered use position illustrated in FIGS. 3 and 4 from the raised stored position shown in FIGS. 1 and 2. For such purpose, an internal torque device such as that shown in U.S. Pat. No. 4,500,131 may be employed for coupling the visor body to the pivot rod. Rod 15 is hollow to serve as an electrical conduit for at least one conductor for supplying operating power for lamps in the illuminating means as described below in connection with FIG. 10.

Figure 2:
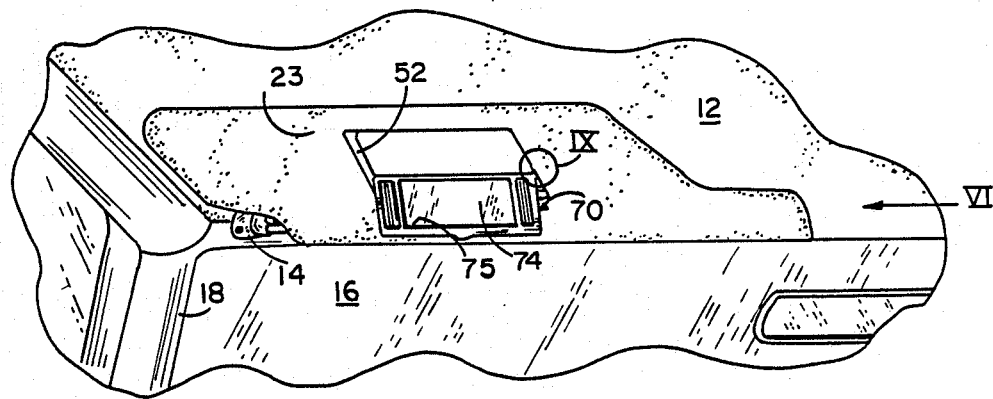
FIG. 2 is a fragmentary perspective view of the visor shown in FIG. 1 with an illuminated vanity mirror assembly opened to a use position while the visor remains in a stored position.
Figure 3:
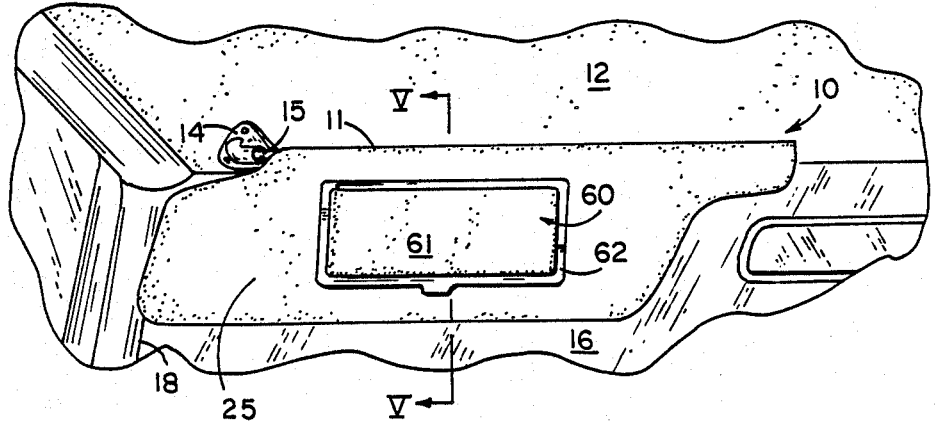
FIG. 3 is a fragmentary perspective view of the visor shown in FIGS. 1 and 2 moved to a lowered use position.
Figure 11:
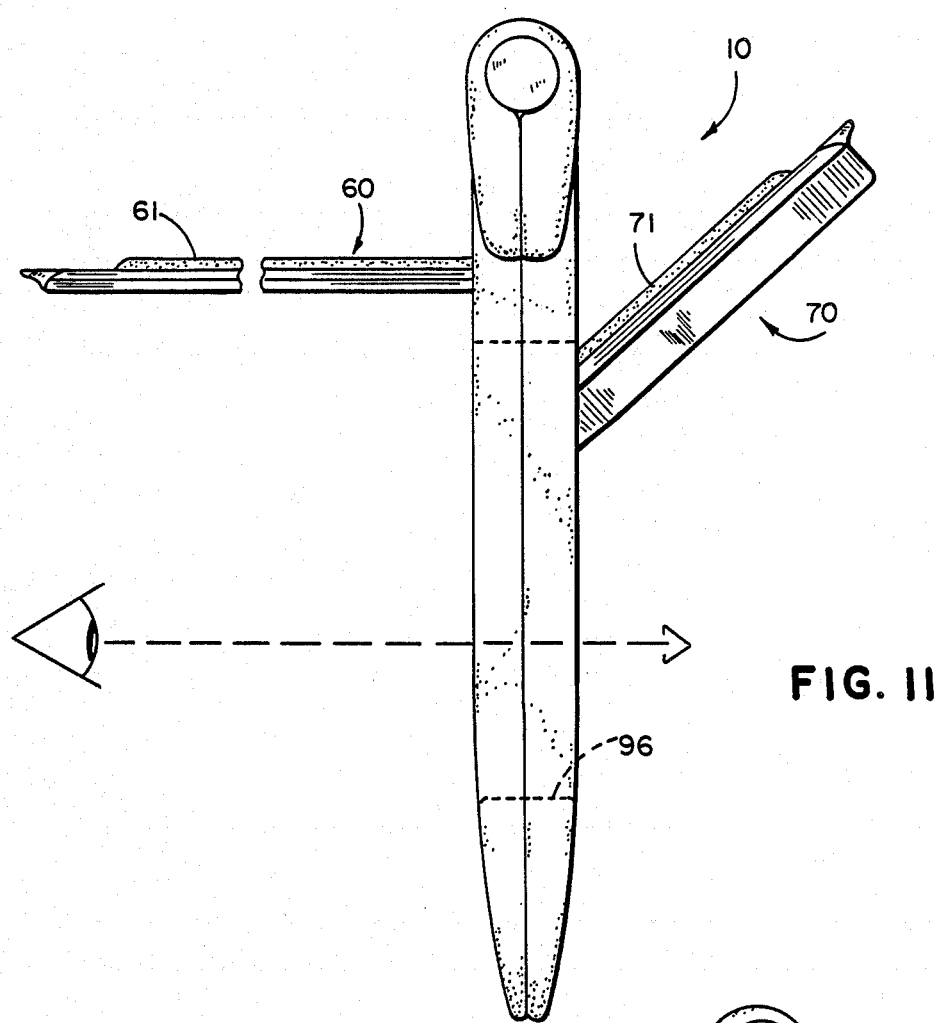
FIG. 11 is a right side view of the visor shown in FIGS. 1–10 with both covers open to provide an open window through the visor.
Figure 12:
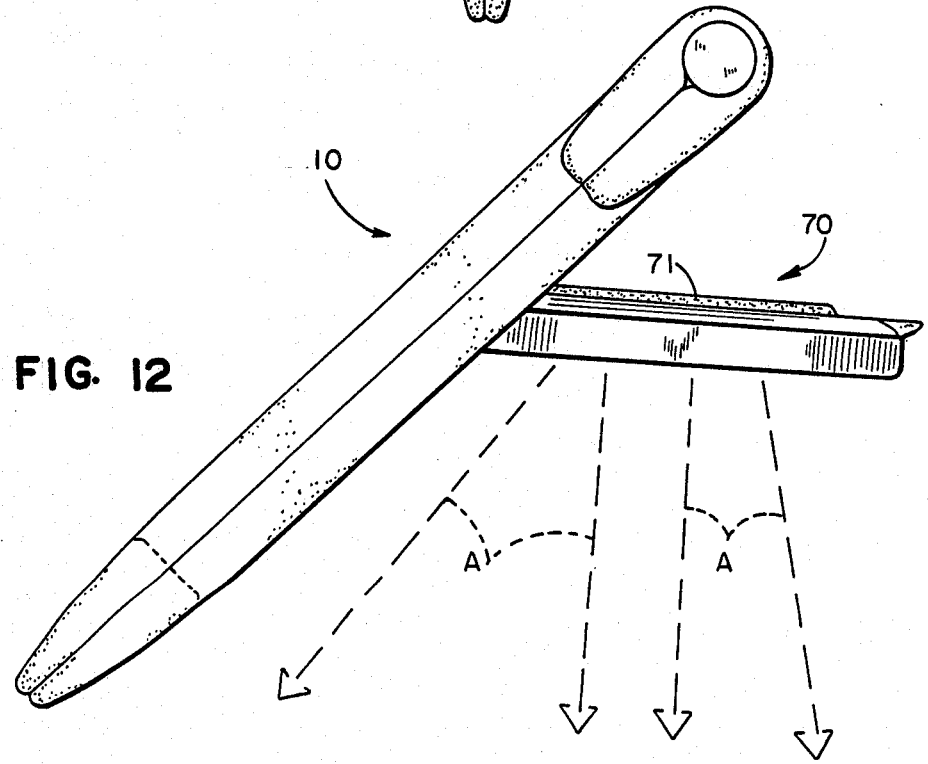
FIG. 12 is a right side view of the visor shown in FIGS. 1–10 showing a position of use for providing a map reading light.

Before describing the construction of the visor in detail, a brief description of the visor and its operation is presented in connection with the operational sequence shown in FIGS. 1–4. The visor 10 includes an illuminated vanity mirror assembly 70 (FIGS. 1 and 2) which defines a cover which is pivotally mounted to a frame 50 (FIG. 4). The assembly 70 pivots downwardly from one side of the visor when the visor is in a raised stored position as shown in FIG. 1, to a lowered use position illustrated in FIG. 2 exposing an illuminated vanity mirror 74 for use. The illuminated vanity mirror assembly 70 on the other hand can remain in its stored position illustrated in FIG. 1 and the visor 10 lowered to a use position as illustrated in FIG. 3 in which a cover 60, enclosing a relatively large rectangular opening 28 formed in the visor core to receive and support frame 50, is opened as illustrated in FIG. 4, to expose the illuminated vanity mirror assembly 70. This allows the user to use mirror 74 with the visor in either a raised stored position shown in FIGS. 1 and 2 or in a lowered use position shown in FIGS. 3 and 4. Other use positions are illustrated in FIGS. 11 and 12 described below.

The visor body 20 (FIG. 5) comprises an internal core 22 molded in a clam shell configuration of a suitable polymeric material such as polypropylene which includes core halves 24 and 26 joined at a hinge line near top 11. The visor body is substantially planar defining front and rear major facing surfaces 23 and 25 respectively through which there is formed an opening defined by a first relatively large rectangular opening 28 in core half 24 and a second smaller rectangular opening 29 in core half 26. A first generally rectangular frame 50 (FIGS. 4 and 5) is mounted within opening 28. Pivotally mounted to one side of frame 50 is the illuminated vanity mirror assembly 70 including a subframe 72 supporting mirror 74 therein. Cover 60 is pivotally mounted to the other side of frame 50 for selectively enclosing aperture 28 as seen in FIG. 3.

The visor core 22 is covered by a suitable upholstery material 21 such as a cushioned fabric as seen in FIG. 5. Cover 60 and the outside cover of assembly 70 may also include decorative fabric panels 61 and 71 surrounding their molded polymeric bodies. As seen in FIGS. 1 and 5, assembly 70 fits within frame 50. Thus, visor core 22 includes a generally rectangular opening extending through the entire visor body 20 with opening 29 having a smaller dimension than opening 28 since subframe 77 is significantly smaller than the frame 50 to which it is pivotally secured.

Figure 8:
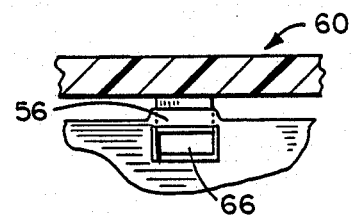
FIG. 8 is an enlarged fragmentary front elevational view partially in cross-section of a cover hinge shown in the encircled area in FIG. 4.

Frame 50 is generally rectangular having sidewalls 52 (FIGS. 2 and 4) and integral upper and lower walls 54 (FIGS. 4 and 5). Frame 50 is secured within aperture 28 and the inner surface of core member 26 surrounding aperture 29 by a suitable bonding method such as an adhesive or welding as best seen in FIG. 5. The top 54 of frame 50 includes a pair of spaced pintles 56 (FIGS. 4 and 8) which define pivot axles and include camming surfaces thereon to cooperate with a pair of spaced resilient C-shaped pivot hinges 66 of snap-on cover 60. This hinge construction is substantially the same as that disclosed in U.S. Pat. No. 4,213,169, the disclosure of which is incorporated herein by reference. Thus, cover 60 will snap fit onto frame 50 and be biased open to its use position shown in FIGS. 4 and 7 and biased to a closed position shown in FIG. 3.

Upon opening, cover 60 actuates a switch 90 (FIG. 10) mounted within the visor core in the upper portion thereof and actuated by cam 92 (FIG. 5 and shown schematically in FIG. 10) for activating illumination means comprising lamps 100 and 102 mounted within assembly 70 behind lenses 104 and 106 (FIG. 4) for providing illumination for use of mirror 74. The electrical coupling of lamps 100 and 102 to the vehicle's electrical system is explained in greater detail below in connection with FIG. 10. The mirror 74 and its subframe 77 are thus pivotally mounted within frame 50 to face rearwardly in the vehicle when the visor is in a lowered use position and the mirror and its illumination means exposed through the open frame 50 for use when cover 60 is opened as seen in FIG. 4.

Figure 9:
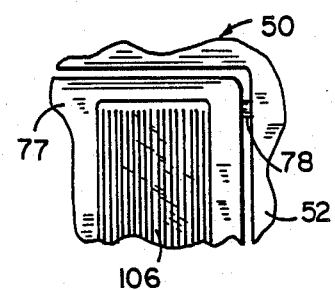
FIG. 9 is an enlarged fragmentary front elevational view of the pivot mounting structure shown in the encircled area of FIG. 2.

Assembly 70 includes a generally rectangular subframe 77 having integral flanges 73 (FIG. 5) holding mirror 74 against the edges of the central opening 75 of the subframe 77 and a pair of rectangular openings on opposite sides of opening 75 for receiving snap-in lenses 104 and 106. The mounting construction of the lenses, lamps and mirror in subframe 77 is conventional and well-known in the art. Assembly 70, including subframe 77, is pivotally mounted to the inner sides 52 of frame 50 by means of a pair of pivot axles 78 shown in FIGS. 5, 9 and 10. Axles 78 are each secured to subframe 77 by a suitable mounting boss 79 and are allowed to pivot with a predetermined torque within sidewalls 52 of frame 50.

Subframe 77 is enclosed at its side opposite mirror 74 by a cover panel 72 as best seen in FIG. 5 which can be covered with upholstery material 71 as seen in FIGS. 1 and 5 to match the appearance of the larger cover 60, if desired. Subframe 77 actuates a second electrical switch 94 when pivoted open as seen in FIG. 2 to illuminate the lamps. Switch 94 (FIGS. 5 and 10) is mounted in frame 50 with its actuating button engaging the upper side 75 of subframe 77, such that when assembly 70 is in its stored position, illustrated in FIG. 5, switch 94 will be in an open position. However, when subframe 77 is pivoted downwardly, as illustrated in FIG. 6, the spring loaded push-button switch 94 will close to supply electrical operating power to lamps 100 and 102. Axles 78 are frictionally fit within mounting bosses 79 to hold the illuminated vanity mirror assembly 70 in any lowered use position desired as well as hold the structure in a stored position as illustrated in FIGS. 1, 3 and 4.

It is possible to open both cover 60 and assembly 70, if desired to provide an open window 96 through the visor body 20 as seen in FIG. 11. Window 96 has approximately the size of opening 29 and is bordered by frame 50. Also, the illuminated vanity mirror package 70 can be pushed to an open position illustrated in FIG. 6 with the visor 10 in a lowered use position as shown in FIG. 4 with cover 60 closed such that the illumination means can provide a light directed downwardly as shown by arrows A in FIG. 12 for map reading and like functions.

Figure 10:
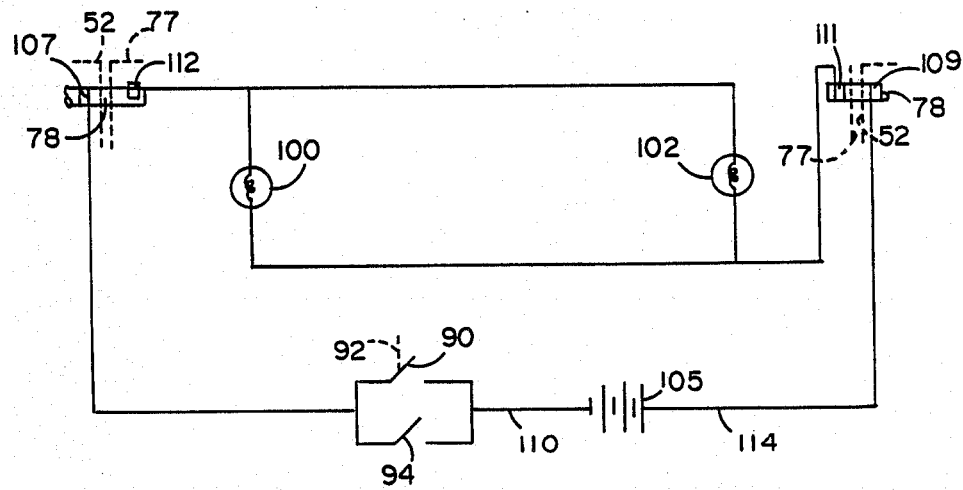
FIG. 10 is an electrical circuit diagram in schematic form of the illumination means for the vanity mirror shown in FIGS. 1–9.

The electrical circuit for supplying electrical power to lamps 100 and 102 is shown in FIG. 10. The source of operating power 105 for the vehicle, typically comprises its battery which is coupled to lamps 100 and 102 through switches 90 and 94, axles 78, which are made of a conductive material, and slip ring contacts 107 and 109. The interconnecting electrical conductors 110 and 114 constitute the normal vehicle wiring harness with a ground conductor from source 105 coupled to contact 109, axle 78 and through a second contact 111 to one terminal of lamps 100 and 102. The positive terminal of the power supply is coupled through one of the two switches 90 or 94 through slip ring contact 107 axle 78 and through a second contact 112 to the remaining terminal of lamps 100 and 102. Thus, the actuation of either switch 90 or 94 will cause lamps 100 and 102 to be activated for providing illumination through the lens 104 and 106 positioned in front of the lamps. Conductor 110 from the vehicle power supply extends through the hollow pivot axle 15 to the body of the visor while the ground conductor 114 can include the sheet metal of the vehicle, bracket 14 and rod 15.

Thus, it is seen with the unique visor construction of the present invention, the illuminated vanity mirror of the preferred embodiment can be used in any position of the visor and can be used for providing either light for use of the mirror directly or direct light downwardly towards the user's lap for use of the illumination means for map reading or the like under low ambient light conditions.

It will become apparent to those skilled in the art, that various modifications to the preferred embodiment of the invention described herein can be made without departing from the spirit or scope thereof as defined by the appended claims.

The embodiments of the invention in which an exclusive property or privilege is claimed are defined as follows.

1. A vehicle visor comprising:
   a visor body having forwardly and rearwardly facing major surfaces and an aperture extending through said visor body and through said surfaces to define an opening through said visor; and
   a vanity mirror assembly including a mirror, said assembly pivotally mounted to said visor body to be movable from a position substantially parallel with said facing surfaces of said visor and facing rearwardly when said visor is in a lowered use position such that said mirror is exposed through said opening, and wherein said assembly can be pivoted through an angle of at least 90 in a forward direction from said visor body such that the mirror can be used as a vanity mirror when the visor is in a raised stored position against the vehicle headliner.

2. The apparatus as defined in claim 1 and further including cover means pivotally coupled to said body on a side of said visor body opposite said vanity mirror assembly for selectively covering said mirror.

3. The apparatus as defined in claim 2 and further including means for providing illumination for said mirror.

4. The apparatus as defined in claim 3 wherein said illumination means is mounted to said vanity mirror assembly adjacent said mirror for further serving as a map lamp when the visor is in a lowered use position and said vanity mirror assembly pivoted from said visor body.

5. The apparatus as defined in claim 4 wherein said visor includes switch means actuated by said cover and by said vanity mirror assembly for actuating said illumination means when either said cover is opened or said vanity mirror assembly pivoted from said visor body.

6. A vehicle visor comprising:
   a visor body having an aperture extending through opposite sides of said visor body to define an opening completely through said visor body;
   cover means for covering said opening from one side of said body; and
   a vanity mirror pivotally mounted to said body for enclosing said opening from an opposite side of said body and movable from a position substantially flush with said visor body and facing said cover and to a position extended from said visor body such that the mirror can be used as a vanity mirror when the visor is in a raised stored position against the vehicle headliner.

7. A vehicle visor comprising:
   a visor body having an aperture extending through said visor body to define an opening through said visor;
   cover means pivotally mounted to said visor body for covering said opening from one side of said body; and
   a vanity mirror pivotally mounted to said body for enclosing said opening from an opposite side of said body and movable from a position substantially flush with said visor body and facing said cover and to a position extended from said visor body such that the mirror can be used as a vanity mirror when the visor is in a raised stored position against the vehicle headliner.

8. The apparatus as defined in claim 7 wherein said cover is pivoted about an axis proximate an upper edge of said visor body and said vanity mirror is mounted to pivot about an axis parallel to and on the same side of said opening of said visor as said cover pivot axis.

9. The apparatus defined in claim 8 wherein said vanity mirror is mounted to a frame assembly which further includes means for providing illumination directed outwardly from adjacent said mirror.

10. The apparatus as defined in claim 9 wherein said visor includes switch means actuated by said cover and by said vanity mirror assembly for actuating said illumination means when either said cover is opened or said vanity mirror assembly pivoted from said visor body.

11. A vehicle visor comprising:
    a visor body having an aperture extending through opposite sides of said visor body to define an opening completely through said visor;
    a first cover mounted said visor body for selectively covering said opening from one side of said visor;
    a second cover mounted to said visor body for selectively covering said opening from an opposite side of said body; and
    a vanity mirror mounted to an inside surface of one of said covers and facing the remaining cover such that said mirror is exposed for use when said one or remaining cover is opened.

12. The apparatus as defined in claim 11 wherein said one cover is pivotally mounted to said visor body.

13. The apparatus as defined in claim 12 wherein said one cover includes means for illuminating said mirror for use in low ambient light.

14. A vehicle visor comprising:
    a visor body having an aperture extending through said visor body to define an opening through said visor;
    a first cover mounted said visor body for selectively covering said opening from one side of said visor;
    a second cover mounted to said visor body for selectively covering said opening from an opposite side of said body; and
    a vanity mirror mounted to an inside surface of one of said covers and facing the remaining cover such that said mirror is exposed for use when said one or remaining cover is opened, wherein said one cover is pivotally mounted to said visor body, and includes means for illuminating said mirror for use in low ambient light; and wherein said remaining cover is pivotally mounted to said visor body.

* * * * *